United States Patent [19]

Herold

[11] Patent Number: 5,234,101

[45] Date of Patent: Aug. 10, 1993

[54] BELT FASTENER

[75] Inventor: Wolfgang Herold, Offenbach am Main, Fed. Rep. of Germany

[73] Assignee: Steelcase Inc., Grand Rapids, Mich.

[21] Appl. No.: 861,554

[22] Filed: Apr. 1, 1992

[30] Foreign Application Priority Data

Apr. 4, 1991 [DE] Fed. Rep. of Germany ....... 4110818

[51] Int. Cl.$^5$ .............................. B65G 15/30
[52] U.S. Cl. ................. 198/844.2; 24/31 H; 24/33 R
[58] Field of Search .............. 198/844.2, 846; 24/31 H, 31 F, 31 R, 33 A, 33 F, 33 P, 33 B, 33 L, 37; 474/255, 257

[56] References Cited

U.S. PATENT DOCUMENTS

| 3,327,358 | 6/1967 | Schick | 24/33 B |
|---|---|---|---|
| 4,151,634 | 5/1979 | Stolz | 29/509 |
| 4,315,349 | 2/1982 | Stolz | 24/31 H X |
| 4,653,156 | 3/1987 | Stolz et al. | 24/31 H X |
| 4,671,403 | 6/1987 | Schick | 198/844.2 |
| 4,937,921 | 7/1990 | Musil | 24/33 R X |
| 4,942,645 | 7/1990 | Musil | 24/33 R X |
| 5,038,442 | 8/1991 | Stolz et al. | 24/33 P |
| 5,095,590 | 3/1992 | Schick | 198/844.2 X |
| 5,097,944 | 3/1992 | Schick | 198/844.2 |

FOREIGN PATENT DOCUMENTS

| 0018827 | 1/1882 | Fed. Rep. of Germany . | |
|---|---|---|---|
| 0036837 | 2/1886 | Fed. Rep. of Germany . | |
| 0832366 | 1/1952 | Fed. Rep. of Germany . | |
| 1183322 | 12/1964 | Fed. Rep. of Germany . | |
| 1186698 | 2/1965 | Fed. Rep. of Germany | 198/844.2 |
| 1951070 | 4/1971 | Fed. Rep. of Germany . | |
| 2545401 | 10/1976 | Fed. Rep. of Germany . | |
| 2708489 | 9/1977 | Fed. Rep. of Germany | 24/33 R |
| 2626443 | 12/1977 | Fed. Rep. of Germany . | |
| 2920461 | 11/1980 | Fed. Rep. of Germany . | |
| 3843872 | 6/1990 | Fed. Rep. of Germany | 198/844.2 |
| 1197967 | 11/1960 | France | 24/31 H |
| 2365730 | 4/1978 | France | 24/33 B |
| 2593872 | 8/1987 | France | 24/33 P |

OTHER PUBLICATIONS

Backstrome, Die Bergbau-Auliefesindustrie auf des Hannover-Messe, June 1968, Gluckauf.

Primary Examiner—Robert P. Olszewski
Assistant Examiner—James R. Bidwell
Attorney, Agent, or Firm—Price, Heneveld, Cooper, DeWitt & Litton

[57] ABSTRACT

The invention refers to a conveyor belt connecting element provided with a loop with leg-like extensions, the loop being intended to accommodate a coupling rod, as well as with openings in the leg-like extensions for inserting staples that serve to attach such connecting elements to the end of a conveyor belt. The essence of the invention is that the particular leg of the conveyor belt connecting element against which the free end of the staple legs rest, is provided with sloping contact surfaces for the free ends of the staple legs, and that the respective slope runs from the openings, provided for the staples, towards the loop as well as in the direction of the conveyor belt.

4 Claims, 2 Drawing Sheets

BELT FASTENER

BACKGROUND OF THE INVENTION

The invention refers to a conveyor belt connecting element provided with a loop with leg-like extensions, same loop being intended to accommodate a coupling rod, and with openings in the leg-like extensions for insertion of staples; furthermore, the invention refers to a method as well as a device to attach such connecting elements to the end of a conveyor belt. Conveyor belt connecting elements of the mentioned type are known as per the German Patent No. 2920461, for instance, furthermore, devices and methods for attaching these conveyor belt elements to the end of a conveyor belt are also described and illustrated in the German Patent Specifications No. 2545401. Even though such conveyor belt connecting elements essentially do meet the demands made upon them in a satisfactory manner, time and again problems appear when, during the attaching operation, the free ends of the staple legs are not bent completely, i.e., are not positioned exactly parallel to the belt's surface and, thus, slightly protrude during operation. This may mean that when the free staple leg ends pass over the carrying rollers they can vibrate freely, which in turn, due to the alternating bending loads, will result in a permanent fatigue fracture.

Furthermore, the danger of a permanent fatigue fracture resulting from alternating bending loads during operation, is especially great if the staple legs have already become damaged, beforehand, in the transition region between their center parts and the respective free ends, while the conveyor belt connecting elements were being attached to the conveyor belt end. Buckling of the center parts may produce already fine cracks in the region leading to the free ends of the staple legs, which then, due to alternating bend loads, will result relatively quickly in fatigue fracture.

SUMMARY OF THE INVENTION

Thus, it is the endeavor of the invention to design the conveyor belt connecting element in such a way that said alternating bending loads cannot occur anymore, and to create a method and a device, which will allow to attach the conveyor belt connecting elements reliably and securely at the conveyor belt end, while at the same time, subjecting the staples only to a gentle stress.

In order to achieve this end, the invention requires that in each case the particular leg of the conveyor belt connecting element against which the free end of the staple legs rest, be provided with sloping/beveled contact surfaces for the free ends of the staple legs, and that in each case the slope's direction run from the openings (provided for the staples) towards the loop as well as towards the conveyor belt.

When designed in this manner, the free ends of the staple legs will not stand up anymore, nor will they be made to vibrate freely by the carrying rollers. Consequently, alternating bend loads and fatigue fractures of the type like those known up to now, are impossible.

Furthermore, the contact surfaces for the staple legs should preferably be the bottom part of flute-like recesses (channels), into which the staple legs will enter at least their free ends. Thus, they are highly protected against stress.

A further development of the invention provides that, preferably, the staples are attached in such a way that in a first step, the free ends of the staple legs that are inserted through the conveyor belt end and the legs of the conveyor belt connecting elements are bent over only partially, and then, in a second step, they are bent down completely, and their free ends are pressed down in such a way that they dip towards the conveyor belt end. The pressure that is required for this operation is applied both to a defined area at the free ends of the staple legs and to the center part of the staples, with the result that premature damage in the transition region from the center part to the free ends of the staple legs does not occur anymore.

Further developments and special design features of the invention can be gathered from the dependent claims, in context with the description and the drawing.

BRIEF DESCRIPTION OF THE DRAWINGS

Below follows a detailed description of the invention, based on an example of application, as shown in the drawing. Shown are in.

DETAILED DESCRIPTION OF THE PREFERRED EMBODIMENT

Figure 1:
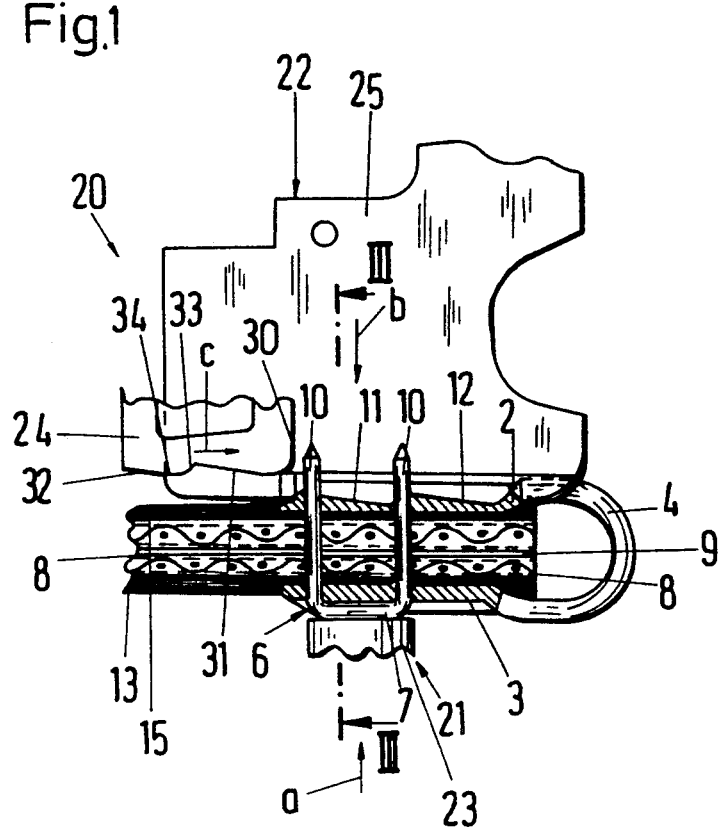
FIG. 1: a sectional view, in a larger scale, of a conveyor belt connecting element with a lower tool and an upper tool, during the phase prior to bending down the legs of a staple.

The conveyor belt connecting element 1 consists of two leg-like extensions 2 and 3, and a loop 4 that connects them, the loop 4 also serves to accommodate a coupling rod, which is of no particular interest in this context. Openings 5 for the staples 6 are provided in the legs 2 and 3, though only one of the staples 6 is shown in the FIGS. 1, 2 and 4. When mounted, the staple's cross piece 7 rests against the outside of one leg 3 of the conveyor belt connecting element 1 (in FIG. 4, the leg 3 is located below), and its legs 8 pass through the openings 5 in the leg 3, as well as through the conveyor belt end 9, and also through the opening of the second leg 2 (in FIG. 4 the leg 2 is located above) of the conveyor belt connecting element 1. After having been passed or driven through, the free ends 10 of the legs 8 will project in an upright position from the second leg 2 of the conveyor belt connecting element 1, as illustrated in FIGS. 1, 3 and 4.

The leg 2 of the conveyor belt connecting element 1 is provided with sloping contact surfaces 11 and 12 for the free ends 10 of the legs 8 of the staples 6. In each case, these contact surfaces 11 and 12 slope from the openings 5 provided for the staples 6 towards the loop 4, as well as towards the conveyor belt 13. Thus, the contact surfaces 11, 12 lie obliquely/diagonally to the surface 15 of the conveyor belt 13 and, furthermore they are arranged as essentially parallel to each other.

Figure 2:
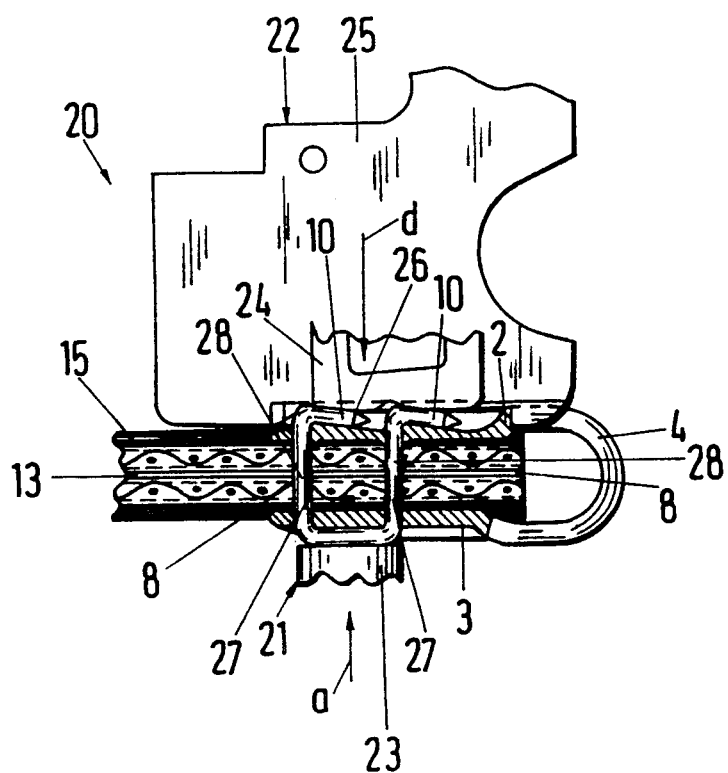
FIG. 2: a view similar to FIG. 1, but showing the staple legs after they have been bent down.
Figure 3:
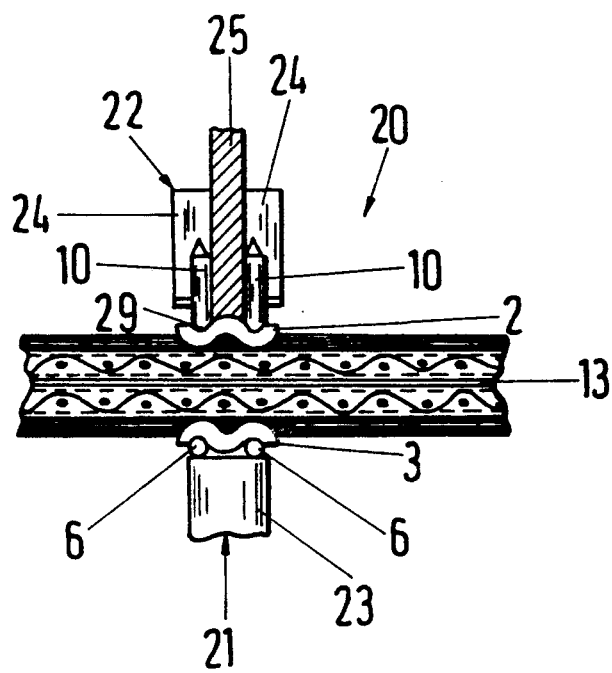
FIG. 3: a sectional view along the line III—III in FIG. 1.
Figure 4:
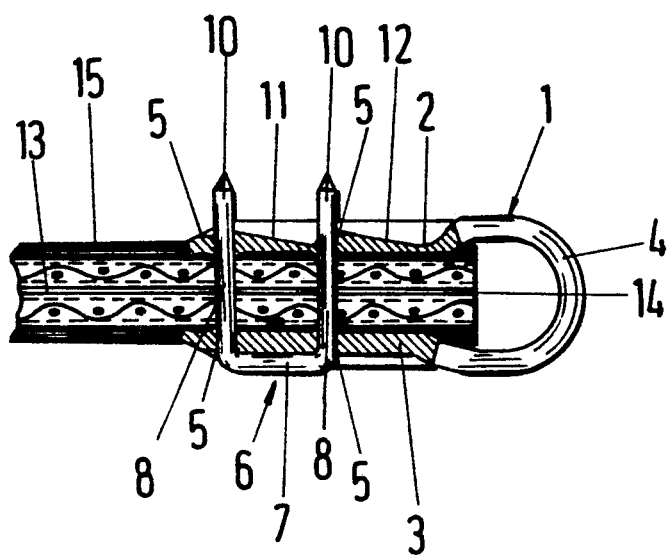
FIG. 4: a view, partly as a cross section, of a conveyor belt connecting element at the end of a conveyor belt, featuring an inserted staple before its legs have been bent down.

FIGS. 1-3, show only parts of a power tool 21 and of an upper tool, respectively, of the device 20 that is used to attach the conveyor belt connecting elements 1 to a conveyor belt 13. The lower tool 21 comprises a pressure piston 23 that can be moved in the direction of arrow "a", and the upper tool 22 comprises a holding-down device, as well as moveable jaws 24 which can be moved in the direction of arrow "b", but also first in the direction of arrow "c" as per FIG. 1, and, then, in the direction of arrow "d", as per FIG. 2. The lower tool 21 or, respectively, its parts, and the upper tool 22 or, respectively, its parts are placed on a suitable machine base (not shown in the FIGS.), and provided with the necessary drive units in order to carry out the desired movements.

When using the device 20 to attach the conveyor belt connecting elements 1, the legs 8 of the staples 6 are first driven through the conveyor belt end 9, and then through the legs 2, 3 of the conveyor belt connecting elements 1. This operation is carried out using the pressure piston 23 which moves the staple of staples 6 in direction of arrow "a", while a holding-down device 25 pertaining to the upper tool 22 holds the leg 2 in its position as per FIGS. 1–3.

As soon as the legs 8 of the staples 6 have been driven through the conveyor belt end 9 and through the legs 2, 3 of the conveyor belt connecting element 1, their free ends 10 are first only partially bent over. This is done with the help of the jaw or jaws 24, FIG. 1, which are movable in the direction of arrow "c", as per FIG. 1. Thus, the free ends 10 of the legs 8 are put in a position, that is approximately parallel to the surface 15 of the conveyor belt 13. In a subsequent step of the operation, the free ends 10 of the staples 6 are then bent down completely till they come to rest on the contact surfaces 11, 12. This operation is also carried out with the aid of the jaw or jaws 24, which in this case move in the direction of arrow "d", as per FIG. 2. During this last stage of the operation, the free ends 10 of the staples 6 are pressed into a position diagonally to the surface 15, pointing towards the inside of the conveyor belt 13. During this part of the operation, pressure is applied only in a defined area on the free ends 10 of the legs 8 of the staples 6, near the points 26 of the staples 6, and, thus, is not applied directly in extension, but staggered in direction to the loops 4, next to the level surfaces 27, where the center parts 28 of the legs 8 are located (FIG. 2). Once the connecting operation is completed, the greater part of the free ends 10 of the staples 6 will be embedded in leg 2 of the conveyor belt connecting element 1, since the contact surfaces 11, 12 for the free ends 10 are, at the same time, the bottom of the flute-like recesses 29 in the legs 2, 3 of the conveyor belt connecting elements 1.

The jaw or jaws 24 on the upper tool 22 move as indicated by arrows "c" and "d", at first moving essentially parallel to the surface 13 of the conveyor belt 15, and then, essentially at right angles (perpendicular) to the movement's initial direction. In this operation, the free ends 10 of the staples 6 are bent with the aid of a bending surface 30 that is front-mounted on the jaw 24. On the side facing the staples, and in accordance with the number of legs 8, each jaw is provided with pressure areas 31 and 32, which are arranged in the direction of arrow "c", one behind the other as well as staggered and, essentially, parallel as well as diagonally to the surface 15 of the conveyor belt 13. The transition from the bending surface 30 to the forward pressure area 31 is arc-shaped. Located between the forward pressure area 31 and the rear pressure area 32 of each jaw 24 (FIG. 1) is a diagonal area 33 that slopes towards the conveyor belt 13, and an intermediate area 34 that is an extension to it, and which lies parallel to the surface 15 of the conveyor belt 13.

It is also convenient if the legs 8 of the staples 6 are arranged/fitted tightly, (without play), preferably even press-fitted, in the openings 5 of the conveyor belt connecting elements 1.

In the foregoing description, it will be readily appreciated by those of ordinary skill in the art that motivations may be made to the invention without departing from the spirit or scope of the concepts disclosed herein. Such modifications are to be considered as included in the claims unless these claims by their language specifically state otherwise.

The embodiment of the invention in which as exclusive property or privilege is claimed are defined as follows:

1. A conveyor belt connecting element for a conveyor belt comprising:
   connecting element legs;
   a loop connecting said connecting element legs and adapted to accommodate a coupling rod;
   said connecting element legs including openings adapted to receive staple legs of staples that are used for attachment to a conveyor belt;
   one of said connecting element legs having sloping contact surfaces adapted to receive the free ends of the staple legs, said sloping contact surfaces each defining a slope that runs from said openings provided for the staples toward said loop as well as in the direction of the conveyor belt.

2. A conveyor belt connecting element as set forth in claim 1 wherein said sloping contact surfaces are arranged substantially parallel to each other.

3. A conveyor belt connecting element as set forth in claim 2 wherein said sloping contact surfaces each include a bottom defining a flute-like recess which is adapted to accommodate the free end of the staple legs.

4. A conveyor belt connecting element as set forth in claim 1 wherein said sloping contact surfaces each include a bottom defining a flute-like recess which is adapted to accommodate the free end of the staple legs.

* * * * *

UNITED STATES PATENT AND TRADEMARK OFFICE
CERTIFICATE OF CORRECTION

PATENT NO. : 5,234,101
DATED : 08/10/93
INVENTOR(S) : Wolfgang Herold

It is certified that error appears in the above-indentified patent and that said Letters Patent is hereby corrected as shown below:

```
Column 3, line 15;
    "staple of" should be --staple or--.
Column 4, lines 20 & 21;
    "motivations" should be --modifications--.
Column 4, line 26;
    "embodiment" should be --embodiments--.
```

Signed and Sealed this

Ninth Day of August, 1994

BRUCE LEHMAN

*Attest:*

*Attesting Officer*    *Commissioner of Patents and Trademarks*

UNITED STATES PATENT AND TRADEMARK OFFICE
CERTIFICATE OF CORRECTION

PATENT NO. : 5,234,101
DATED : 08/10/93
INVENTOR(S) : Wolfgang Herold

It is certified that error appears in the above-indentified patent and that said Letters Patent is hereby corrected as shown below:

On the title page, item [73] Assignee: "Steelcase Inc., Grand Rapids, Mich.' should be --MATO Maschinen-und Metallwarenfabrik Curt. Matthaei GmbH & CO KG--.

Signed and Sealed this

Twentieth Day of September, 1994

Attest:

BRUCE LEHMAN

Attesting Officer

Commissioner of Patents and Trademarks